(12) United States Patent
Hoard et al.

(10) Patent No.: US 11,995,964 B2
(45) Date of Patent: May 28, 2024

(54) SURVEILLANCE CAMERA

(71) Applicant: CareFusion 303, Inc., San Diego, CA (US)

(72) Inventors: David Hoard, Escondido, CA (US); Mustafa Yusufi, Escondido, CA (US); Benjamin Greuel, Neenah, WI (US); Mariano Padilla, Zapopan (MX)

(73) Assignee: CareFusion 303, Inc., San Diego, CA (US)

( * ) Notice: Subject to any disclaimer, the term of this patent is extended or adjusted under 35 U.S.C. 154(b) by 0 days.

(21) Appl. No.: 17/733,498

(22) Filed: Apr. 29, 2022

(65) Prior Publication Data

US 2022/0351591 A1     Nov. 3, 2022

Related U.S. Application Data

(60) Provisional application No. 63/181,839, filed on Apr. 29, 2021.

(51) Int. Cl.

| | |
|---|---|
| *G08B 13/196* | (2006.01) |
| *G03B 17/55* | (2021.01) |
| *G06V 10/56* | (2022.01) |
| *G06V 20/52* | (2022.01) |

(Continued)

(52) U.S. Cl.
CPC ....... *G08B 13/19619* (2013.01); *G03B 17/55* (2013.01); *G06V 10/56* (2022.01);
(Continued)

(58) Field of Classification Search
CPC .... G08B 13/19619; G08B 5/36; G08B 13/06; G08B 13/19613; G08B 29/046;
(Continued)

(56) References Cited

U.S. PATENT DOCUMENTS 10,701,426 B1 *   6/2020   van Hoff ............ G06Q 30/0261
2012/0130534 A1    5/2012   Wurm
(Continued)

FOREIGN PATENT DOCUMENTS

CN     209899337 U     1/2020
CN     210038963 U     2/2020
(Continued)

OTHER PUBLICATIONS

CN111163250A, Camera Module and electronic equipment (Year: 2020).*

*Primary Examiner* — Yogesh K Aggarwal
(74) *Attorney, Agent, or Firm* — Mintz Levin Cohn Ferris Glovsky and Popeo, P.C.

(57) ABSTRACT

A camera assembly may include a camera and one or more heat sinks configured to dissipate heat generated by the camera. The heat sinks being in thermal contact with a printed circuit board including the camera. A housing of the camera assembly may be configured to maintain the camera in a fixed position while the camera assembly is mounted on a medical device such as a dispensing cabinet. The camera in the fixed position may have a deterministic field of view that includes a first area in which interactions with the medical device and adjacent medical devices occurs or is expected to occur. The deterministic field of view of the camera may further exclude a second area where surveillance is unsuitable, prohibited, and/or unnecessary. Images captured by the camera may be analyzed to detect anomalous behavior such as diversion, medical error, hazardous behavior, and protocol noncompliance.

20 Claims, 9 Drawing Sheets

(51) Int. Cl.
  *G08B 5/36* (2006.01)
  *G08B 13/06* (2006.01)
  *H04N 23/51* (2023.01)
  *H04N 23/52* (2023.01)
  *H04N 23/55* (2023.01)

(52) U.S. Cl.
  CPC .............. *G06V 20/52* (2022.01); *G08B 5/36* (2013.01); *G08B 13/06* (2013.01); *G08B 13/19613* (2013.01); *H04N 23/51* (2023.01); *H04N 23/52* (2023.01); *H04N 23/55* (2023.01); *G03B 2217/002* (2013.01)

(58) Field of Classification Search
  CPC .. G03B 17/55; G03B 2217/002; G06V 10/56; G06V 20/52; H04N 23/51; H04N 23/52; H04N 23/55
  See application file for complete search history.

(56) References Cited

U.S. PATENT DOCUMENTS

| | | | |
|---|---|---|---|
| 2013/0070090 A1* | 3/2013 | Bufalini | G16H 20/13 348/143 |
| 2019/0297230 A1 | 9/2019 | Kitagawa | |
| 2019/0346126 A1 | 11/2019 | Wada | |
| 2021/0027875 A1 | 1/2021 | Paydar et al. | |
| 2021/0192909 A1* | 6/2021 | Openshaw | H04N 7/18 |

FOREIGN PATENT DOCUMENTS

| | | |
|---|---|---|
| CN | 111163250 A | 5/2020 |
| CN | 210881919 U | 6/2020 |
| DE | 19642583 A1 | 5/1998 |
| DE | 112019000656 T5 | 12/2020 |

* cited by examiner

SURVEILLANCE CAMERA

CROSS REFERENCE TO RELATED APPLICATION

This application claims priority to U.S. Provisional Application No. 63/181,839, entitled "SURVEILLANCE CAMERA" and filed on Apr. 29, 2021, the disclosure of which is incorporated herein by reference in its entirety.

TECHNICAL FIELD

The subject matter described herein relates generally to optical equipment and more specifically to a surveillance camera.

BACKGROUND

Diversion may refer to the transfer of a controlled and/or high-value substance to a third party who is not legally authorized to receive, possess, and/or consume the substance for personal use or personal gain. High-value and/or controlled prescription medications, notably opioids, may be especially prone to diversion. For instance, a prescription pain medication may be diverted when a clinician keeps the prescription pain medication for unauthorized personal use instead of administering the prescription pain medication to a patient or wasting the prescription pain medication. As such, diversion detection, investigation, and prevention may require surveillance of various interactions with high-value and/or controlled substances.

SUMMARY

Systems, methods, and articles of manufacture are provided for a surveillance camera configured to monitor activities at one or more medical devices. The surveillance camera may capture one or more images of the activities at a medical device including, for example, a diagnostic apparatus, an infusion pump, a dispensing cabinet, a wasting station, and/or the like. The one or more images may be used in workflows associated with the detection, investigation, and prevention of various anomalous behavior. For example, the one or more images may be analyzed to determine whether the activities exhibit anomalies indicative of diversion, medical error, hazardous behavior, protocol noncompliance, and/or the like.

To minimize complexity and opportunities for error during installation and operation, the position of the surveillance camera may be fixed such that the surveillance camera provides a deterministic field of view encompassing one or more areas of interest. For example, the housing of the surveillance camera may be configured to orient the surveillance camera in a direction and/or at an angle from which the surveillance camera is able to capture one or more interactions with a medical device once the surveillance camera is mounted on the medical device. In the case of a surveillance camera that is mounted to a dispensing cabinet, the position of the surveillance camera may be fixed to capture a clinician accessing the dispensing cabinet to retrieve and/or to return a medication. The fixed position further ensures privacy in sensitive areas such as patient care areas.

In one aspect, there is provided an apparatus. The apparatus may include: a camera; one or more heat sinks configured to dissipate heat generated by the camera; and a housing configured to maintain the camera in a fixed position while the apparatus is mounted on a medical device, the housing having a first portion configured to be inserted into a cavity within a panel of the medical device, the first portion of the housing being further configured to receive one or more fasteners for securing the apparatus to the medical device, the camera in the fixed position having a deterministic field of view that includes a first area in which a first interaction with the medical device occurs or is expected to occur.

In some variations, one or more features disclosed herein including the following features can optionally be included in any feasible combination. The housing may maintain the camera at an angle from which the deterministic view of the camera includes the first area.

In some variations, the housing may maintain the camera at an offset from which the deterministic field of view of the camera includes the first area.

In some variations, the apparatus may be mounted at a height and/or an orientation from which the deterministic field of view of the camera includes the first area.

In some variations, the deterministic field of view of the camera may further exclude a second area.

In some variations, the camera may include one or more wide angle lenses and/or ultra wide angle lenses.

In some variations, a second portion of the housing may be configured to remain outside of the cavity and form a flush mounting between the apparatus and an exterior surface of the panel of the medical device.

In some variations, the one or more heat sinks may be an indentation in the housing of the apparatus. The indentation may be configured to receive and/or engage with a flange in the panel of medical device.

In some variations, the one or more heat sinks may be in thermal contact with a printed circuit board including the camera.

In some variations, an interface material may be interposed between a surface of the one or more heat sinks and the printed circuit board. The interface material may be configured to maximize the thermal contact between the one or more heat sinks and the printed circuit board.

In some variations, the medical device may include a diagnostic apparatus, an infusion pump, a dispensing cabinet, a wasting station.

In some variations, the deterministic field of view of the camera may further include a second area in which a second interaction with another medical device occurs or is expected to occur.

In some variations, the camera may be configured to capture one or more images of the first interaction with the medical device.

In some variations, the one or more images may be analyzed to detect an anomalous behavior including one or more of a diversion, a medical error, a hazardous behavior, and a protocol noncompliance.

In some variations, the apparatus may further include a tamper detector configured to detect tampering at the apparatus and generate a signal in response to detecting a threshold level of tampering at the apparatus.

In some variations, the tampering may include a removal of one or more fasteners securing the apparatus.

In some variations, the tampering may include a change in the deterministic field of view of the camera.

In some variations, the tamper detector may include at least one data processor and at least one memory storing instructions that result in operations when executed by the at least one data processor. The operations may include: analyzing an image of a current field of view of the camera by at least comparing the image to a reference image of a field of view of the camera; and detecting, based at least on the analysis indicating an above-threshold difference between the image and the reference image, the threshold level of tampering at the apparatus.

In some variations, the analysis may include identifying one or more objects present in each of the image and the reference image, and comparing a location of the one or more objects in each of the image and the reference image.

In some variations, the analysis may include comparing a first color histogram of the image and a second color histogram of the reference image.

In some variations, the camera may be disabled in response to the signal indicating the threshold level of tampering at the apparatus.

In some variations, the apparatus may further include a visual indicator of a status of the apparatus.

In some variations, the visual indicator may include a light emitting diode configured to display a first color corresponding to a first status and a second color corresponding to a second status.

In some variations, the first status and the second status may be a different one of the camera actively capturing or recording data, the camera being operational but not capturing or recording data, the camera being disabled, tampering being detected at the apparatus, and calibration being performed at the apparatus.

In another aspect, there is provided a dispensing cabinet having an enclosure for storing one or more medications and/or medical supplies. The dispensing cabinet may further include a camera assembly including a camera, one or more heat sinks configured to dissipate heat generated by the camera, and a housing configured to maintain the camera in a fixed position while the camera assembly is mounted on the dispensing cabinet. At least a portion of the housing may be configured to be inserted into a cavity within a panel of the dispensing cabinet. At least the portion of the housing may be further configured to receive one or more fasteners for securing the camera assembly to the dispensing cabinet. The camera in the fixed position may have a deterministic field of view that includes a first area in which an interaction with the dispensing cabinet occurs or is expected to occur. The deterministic field of view may further exclude a second area.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to diversion detection, investigation, and prevention, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
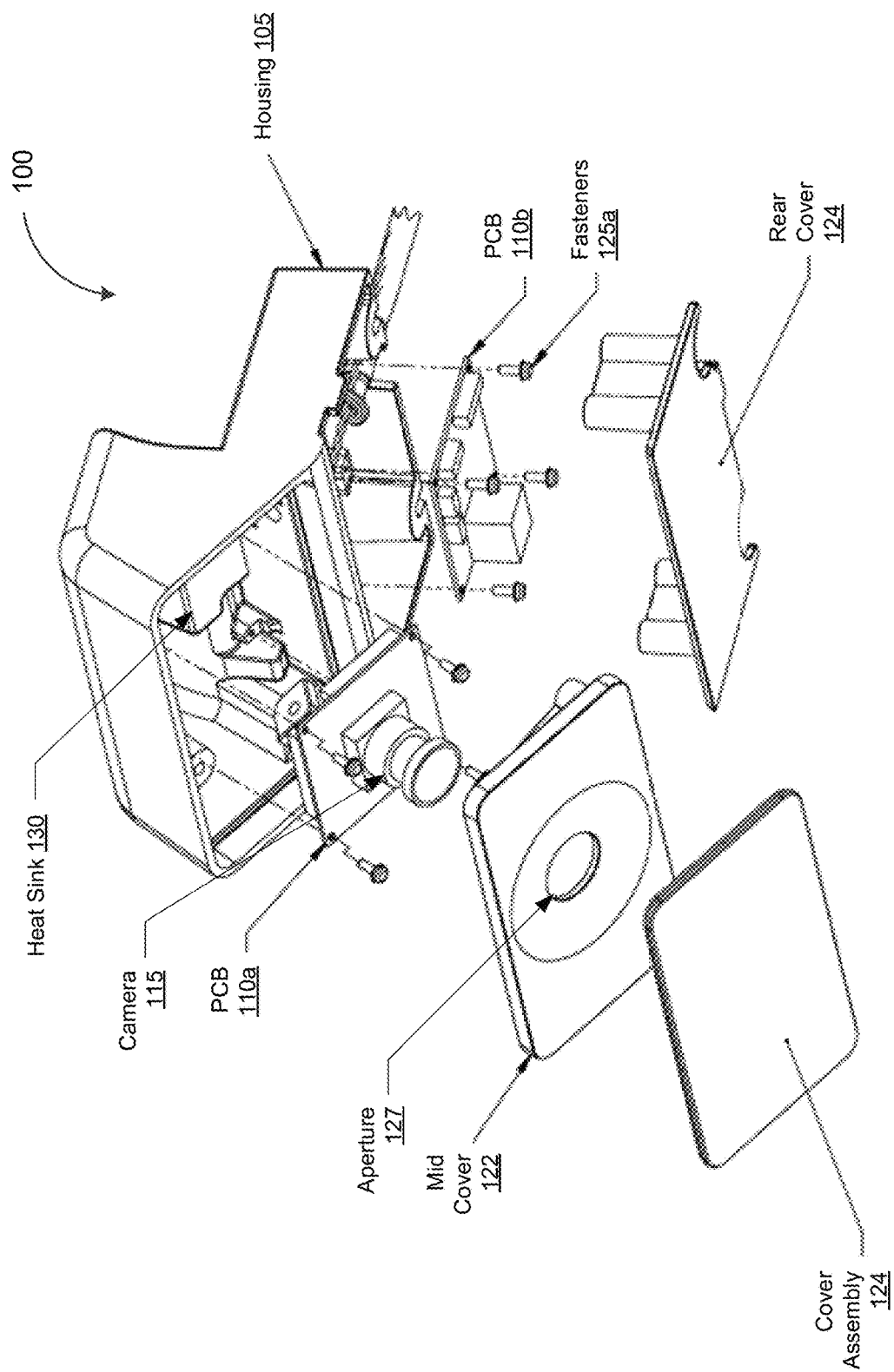
FIG. 1A depicts an exploded view of an example of a camera assembly, in accordance with some example embodiments.

Anomalous behavior, such as diversion, medical error, hazardous behavior, and protocol noncompliance, may occur at any point in time during the lifecycle of a medication including, for example, the shipping, receiving, stocking, dispensing, administration, and/or wasting of the medication. Prescription pain medications may be especially prone to diversion due to a lack of sufficient custodial oversight during, for instance, the shipping, receiving, stocking, dispensing, administration, and/or wasting of the prescription pain medication. The detection, investigation, and prevention of anomalous behavior may therefore require surveillance during each stage of the lifecycle of the prescription pain medication in order to observe and document various interactions with the prescription pain medication. To that end, surveillance cameras may be deployed to capture still images and/or videos of the interactions with the prescription pain medication. However, a conventional surveillance camera may be difficult to integrate into existing medication management systems at least because a proper placement and orientation at which the surveillance camera has an unobstructed view of the interactions with the prescription pain medication may be difficult to achieve. Furthermore, conventional cameras in care settings can present opportunities for using the cameras to accidentally or deliberately capture sensitive information within the care area such as images of patients, care givers, medical records, or the like.

In some example embodiments, a surveillance camera may be configured to provide a deterministic field of view encompassing one or more areas of interest. For example, the surveillance camera may include a housing configured to orient the surveillance camera at an angle from which the surveillance camera is able to capture one or more interactions with a medical device once the surveillance camera is mounted on or adjacent to the medical device. Examples of the medical device may include a diagnostic apparatus, an infusion pump, a dispensing cabinet, and a wasting station. When the surveillance camera is mounted to a dispensing cabinet, for example, the surveillance camera may be fixed at a position from which the surveillance camera is able to capture one or more images of various clinicians accessing the dispensing cabinet to retrieve and/or to return a medication. For instance, the surveillance camera may be motion activated such that the surveillance camera may capture the one or more images in response to detecting motion in the one or more areas of interest. The one or more images may be still images and/or form a part of a video. The images captured by the surveillance camera may be used in workflows associated with the detection, investigation, and prevention of various anomalous behavior. For instance, the one or more images may be analyzed to determine whether the activities exhibit anomalies indicative of diversion, medical error, hazardous behavior, protocol noncompliance, and/or the like.

Figure 1B:
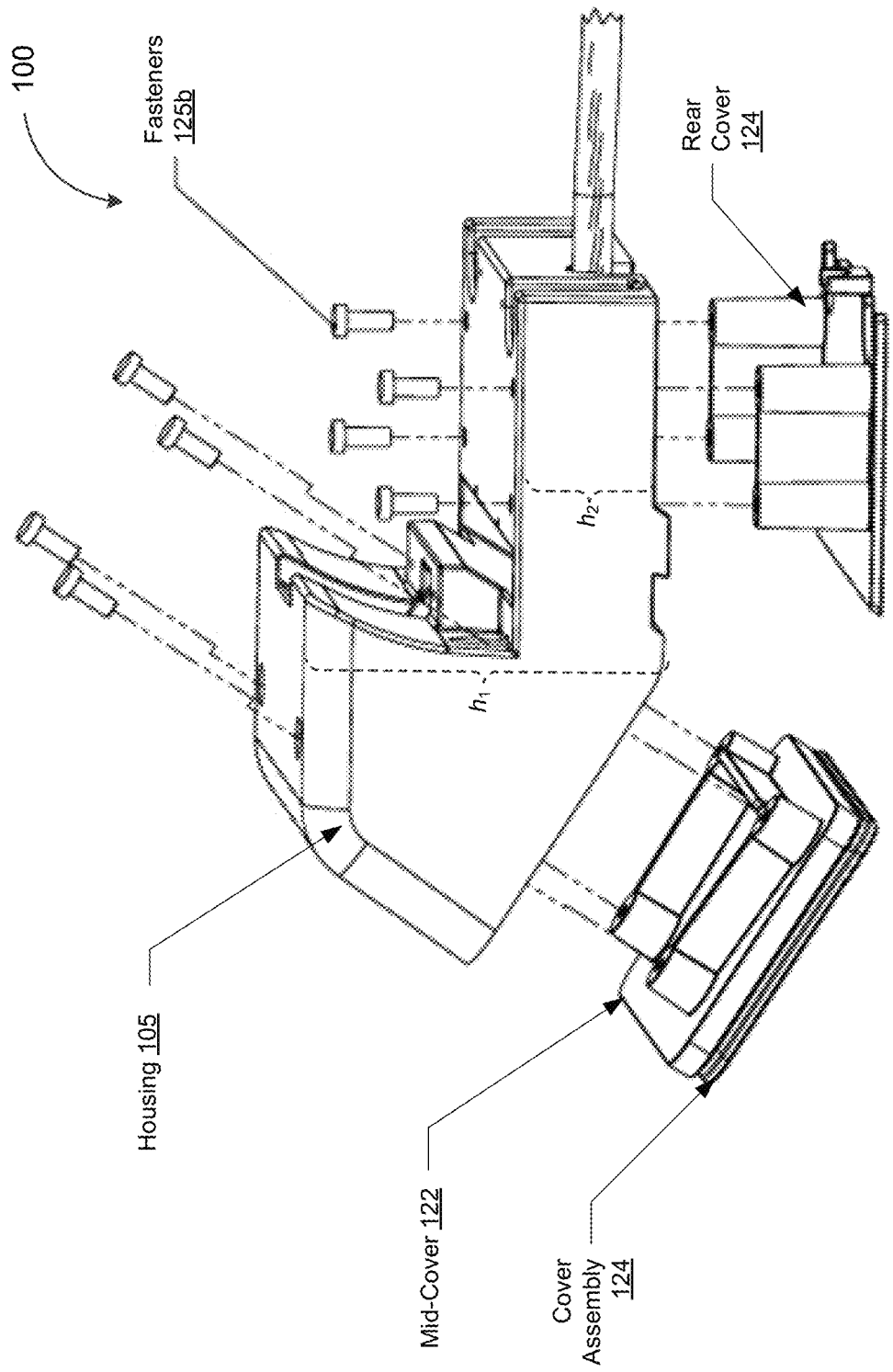
FIG. 1B depicts another exploded view of an example of a camera assembly, in accordance with some example embodiments.
Figure 2A:
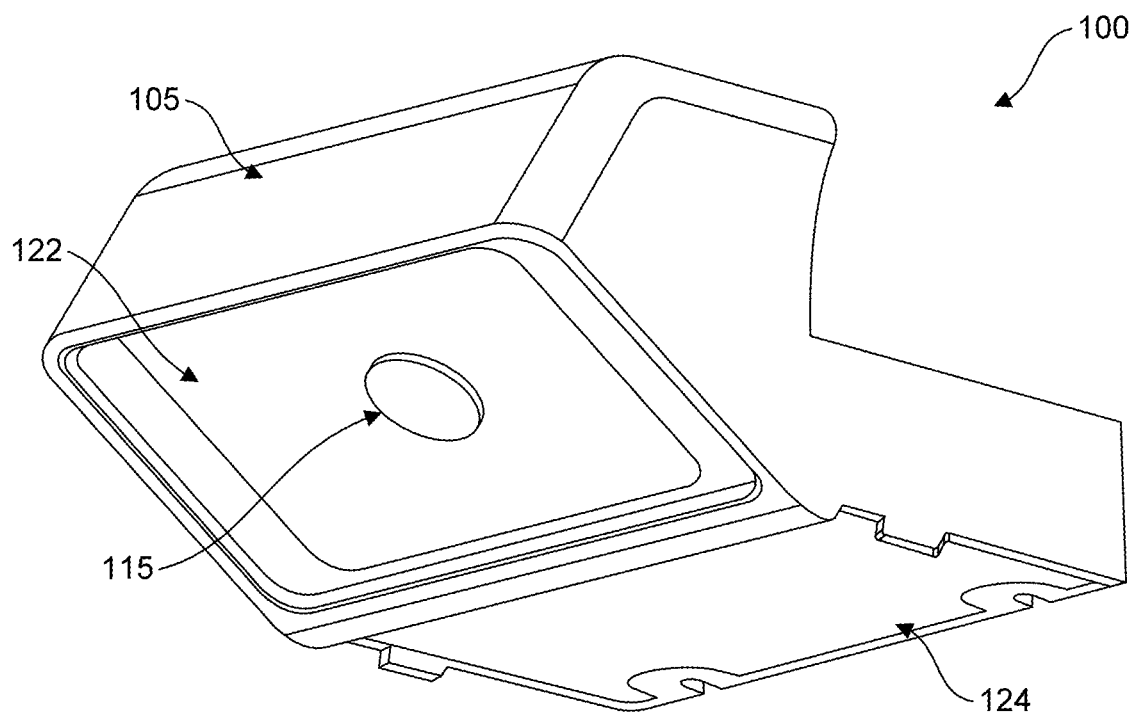
FIG. 2A depicts an assembled view of an example of a camera assembly, in accordance with some example embodiments.
Figure 2B:
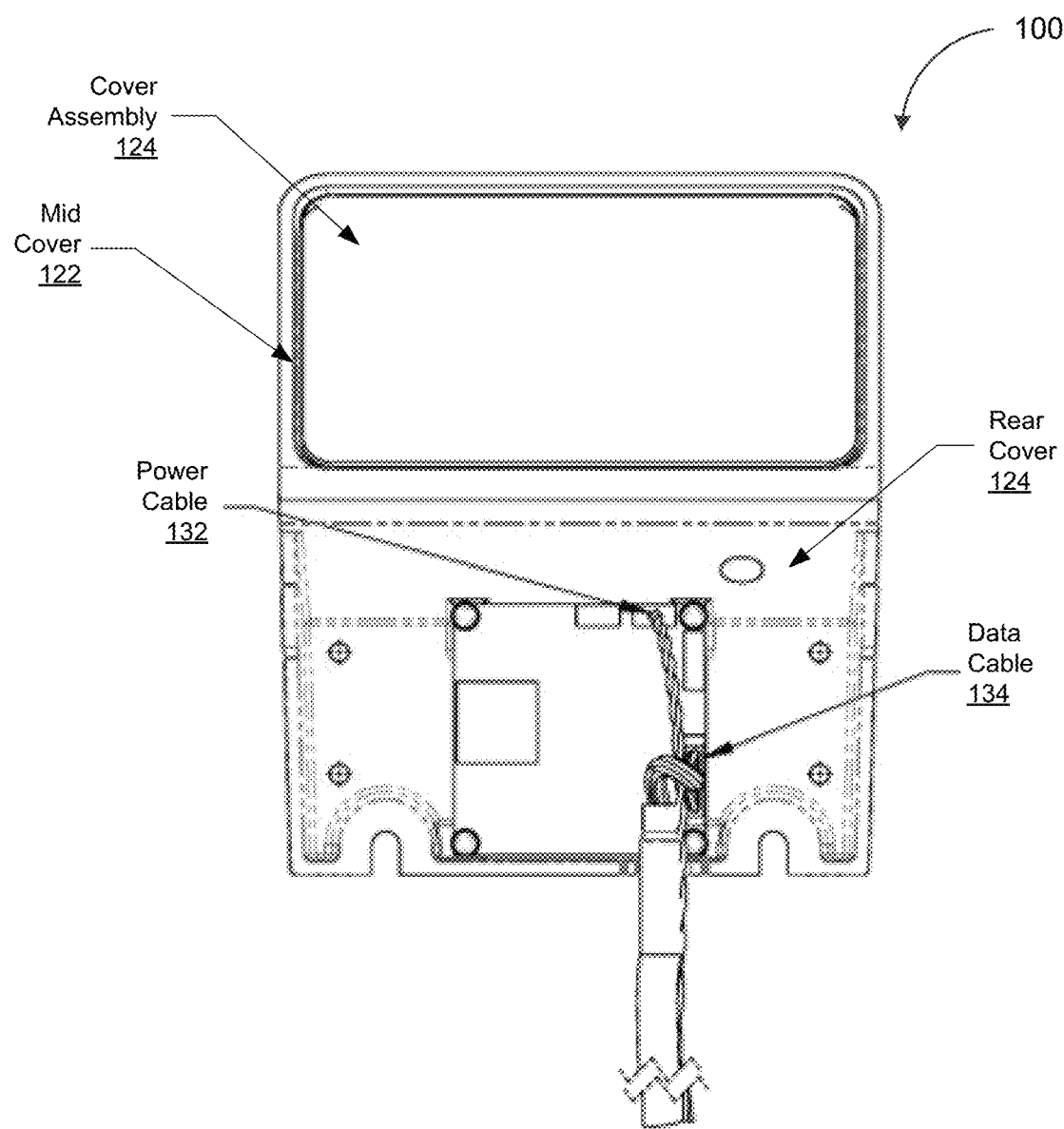
FIG. 2B depicts another assembled view of an example of a camera assembly, in accordance with some example embodiments.
Figure 3:
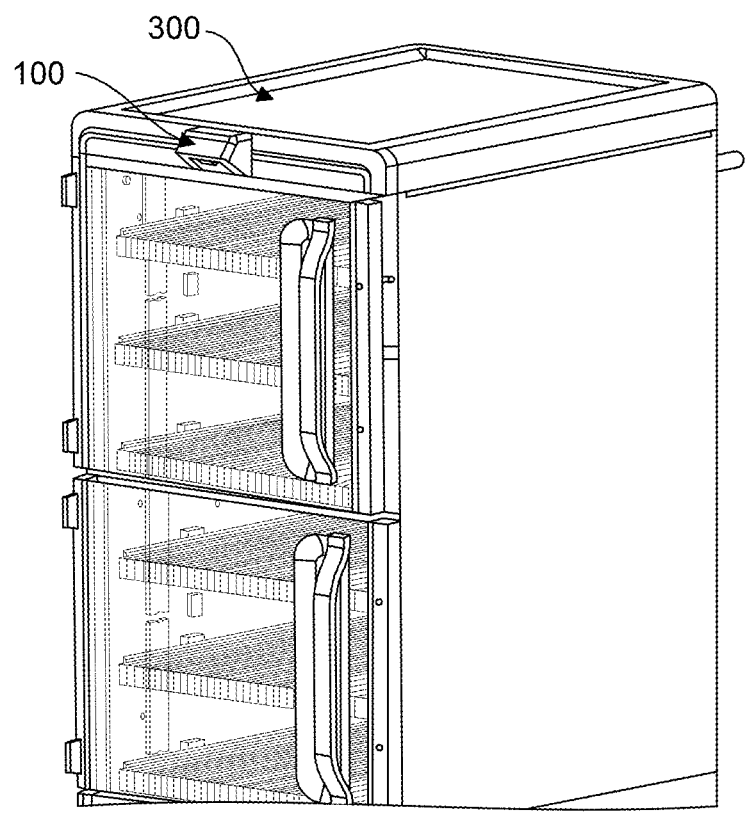
FIG. 3 depicts a perspective view of an example of a mounted camera assembly, in accordance with some example embodiments.

FIGS. 1A-B depict exploded views of an example of a camera assembly 100, in accordance with some example embodiments. Assembled views of the example of the camera assembly 100 are shown in FIGS. 2A-B. Referring to FIGS. 1A-B, the camera assembly 100 may include a housing 105 configured to house a first printed circuit board (PCB) 110a including a camera 115 and a second printed board 110b. As shown in FIGS. 1A-B, the housing 105 may include one or more cavities configured to accommodate the first printed circuit board 110a and the second printed circuit board 110b. For example, the first printed circuit board 110a and the second printed circuit board 110b may be housed in a single cavity. Alternatively, the housing 105 may include two or more separate cavities, each of which containing one of the first printed circuit board 110a and the second printed circuit board 110b. Moreover, in the example of the camera assembly 100 shown in FIGS. 1A-B, the first printed circuit board 110a and/or the second printed circuit board 110b may be secured to the housing 105, for example, using one or more fasteners 125.

The housing 105 may couple with one or more covers, such as a mid-cover 122 and a rear cover 124, in order to an enclosure around the first printed circuit board 110a and the second printed circuit board 110b. As shown in FIGS. 1A-B, one or more fasteners 125 may be used to secure the mid-cover 122 and the rear cover 124 to the housing 105. However, it should be appreciated that the mid-cover 122 and the rear cover 124 may be secured using any retention mechanism such as snap-fit, friction-fit, magnets, adhesives, and/or the like. The mid-cover 122 may be configured to maximize the field of view of the camera 115. For example, the mid-cover 122 may include an aperture 127 configured to interface with the camera 115. At least a portion of the surface around the aperture 127 may be a sloped plane that imposes minimal obstruction to the field of view of the camera 115. Moreover, in the example of the camera assembly 100 shown in FIGS. 1A-B, the mid-cover 122 may couple with a cover assembly 126 configured to protect the camera 115, for example, transportation, installation, and/or use of the camera assembly 100. For instance, as shown in FIG. 2A, the cover assembly 126 may be transparent (or semi-transparent) such that the cover assembly 126 is able to protect the camera 115 without obscuring the field of view of the camera 115.

Referring again to FIGS. 1A-B, the camera assembly 100 may include one or more features for providing heat dissipation. For example, the housing 105 of the camera assembly 100 may include one or more heat sinks, such as the heat sink 130, formed from a thermally conductive material (e.g., a metal such as aluminum (Al) and/or the like) configured to dissipate heat generated by the first printed circuit board 110a and/or the second printed circuit board 110b. The heat sink 130 may direct heat away from the first printed circuit board 110a and/or the second printed circuit board 110b. To minimize power consumption and reduce bulk, the camera assembly 100 may include the heat sink 130 instead of a cooling fan. In the example of the camera assembly 100 shown in FIGS. 1A-B, the heat sink 130 may be integrated into the housing 105, for example, in the cavity housing the first printed circuit board 110a. The heat sink 130 may be a separate component that is fastened to the housing 105, for example, using adhesives (or another attachment mechanism). Alternatively, the heat sink 130 may be a projection formed in the housing 105 such that the heat sink 130 and the housing 105 are part of a single monolithic structure.

The heat sink 130 may be oriented, positioned, shaped, and/or sized to maximize the thermal contact between one or more surfaces of the heat sink 130 and the first circuit board 110a. Maximizing the thermal contact between the heat sink 130 and the first circuit board 110a may maximize the heat dissipation and cooling effect achieved by the heat sink 130. In some example embodiments, an interface material may be interposed between the first printed circuit board 110a and the heat sink 130 to further maximize the thermal contact between the first printed circuit board 110 and the heat sink 130. The housing 105 itself may be formed from a thermally conductive material (e.g., a metal such as aluminum (Al) and/or the like) to further maximize heat dissipation from the camera assembly 100.

Referring to FIGS. 1B and 2B, the camera assembly 100 may include a power cable 132 and a data cable 134. The power cable 132 and the data cable 134 may be coupled with the first printed circuit board 110a and/or the second printed circuit board 110b. The power cable 132 may provide an electric coupling between an external power source (e.g., a power outlet, a battery, and/or the like) and the first printed circuit board 110a and/or the second printed circuit board 110b. Meanwhile, the data cable 134 may be configured to provide a data connection to and from the first printed circuit board 110a and/or the second printed circuit board 110b. For example, the first printed circuit board 110a and/or the second printed circuit board 110b may be communicatively coupled, via the data cable 134, to one or more wired networks and/or wireless networks such as a local area network (LAN), a virtual local area network (VLAN), a wide area network (WAN), a public land mobile network (PLMN), the Internet, and/or the like.

The data connection may enable an exchange of data with the first printed circuit board 110a and/or the second printed circuit board 110b including, for example, the transmission of the one or more images captured by the camera 115 to a remote device for processing, analysis, and/or storage. For example, the camera assembly 100 may include a transceiver to communicate data to and from the camera assembly 100. In some example embodiments, the data cable 134 may provide data connection between the camera 115 and a remote device to enable an exchange of data such as the one or more images captured by the camera 115. Alternatively and/or additionally, the data cable 134 may connect independently to a communication network such as via Ethernet or another networking technology.

The data connection may be a wired connection and/or a wireless connection. For example, the camera assembly 100 may include a wireless transceiver (e.g., Bluetooth, Bluetooth Low Energy (BLE), Near Field Communication (NFC), Wi-Fi, cellular, and/or the like) that enables data to be exchanged wirelessly between the camera 115 and a remote device and/or a communication network. Alternatively and/or additionally, the data connection may be a wired connection, in which case the data cable 134 may provide a direct physical connection between the camera 115 and the remote device and/or communication network.

Figure 4:
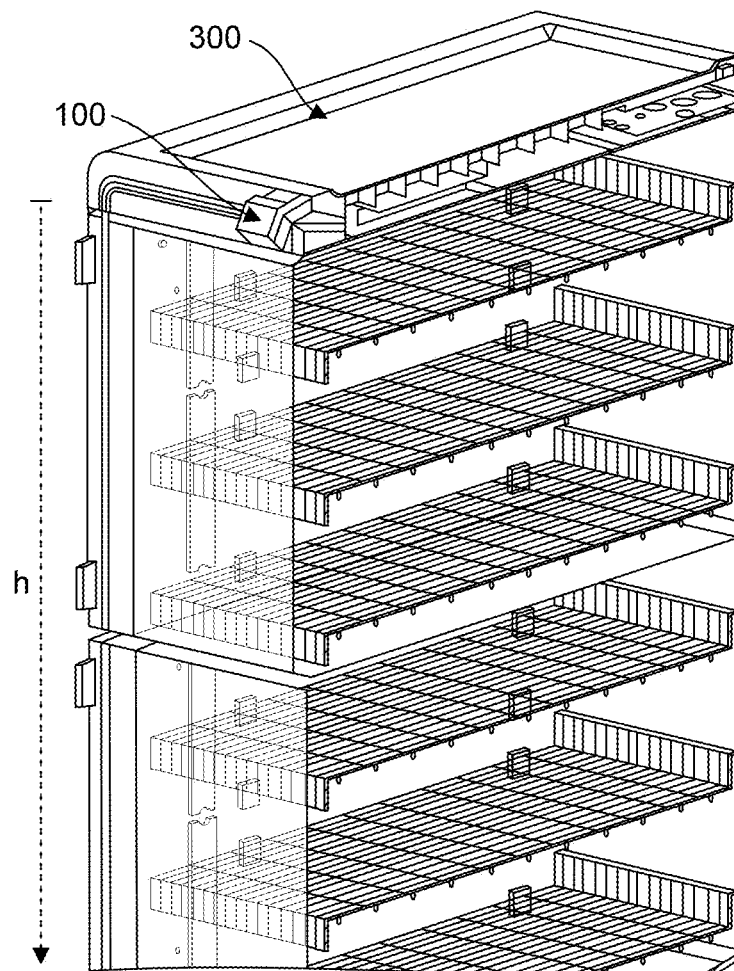
FIG. 4 depicts a perspective view of a cross section of an example of a mounted camera assembly, in accordance with some example embodiments.
Figure 5:
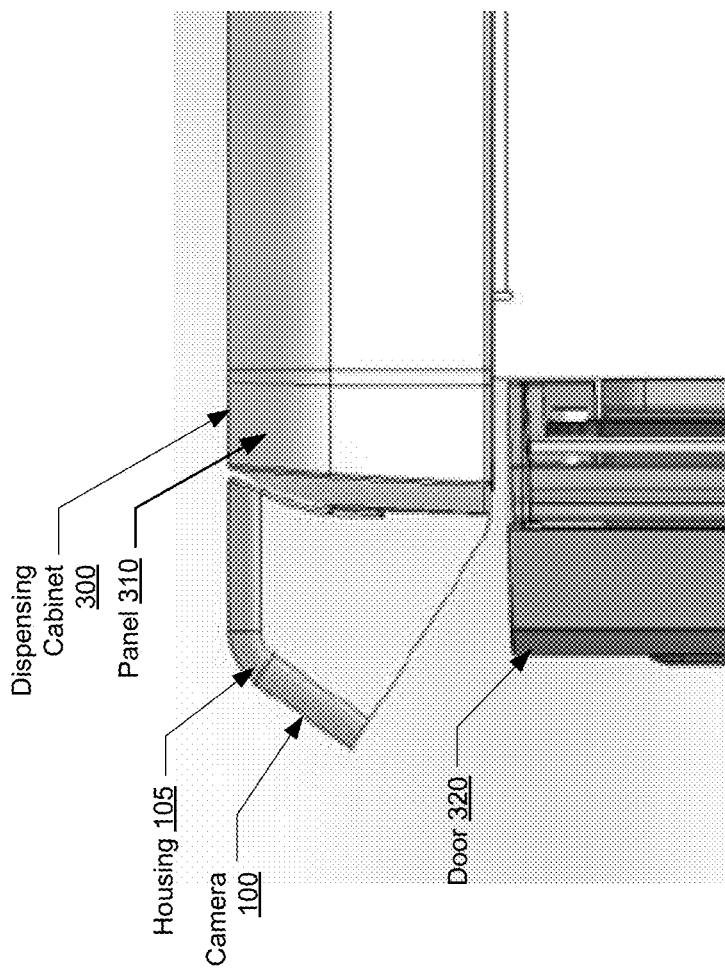
FIG. 5 depicts a side view of an example of a mounted camera assembly, in accordance with some example embodiments.
Figure 6:
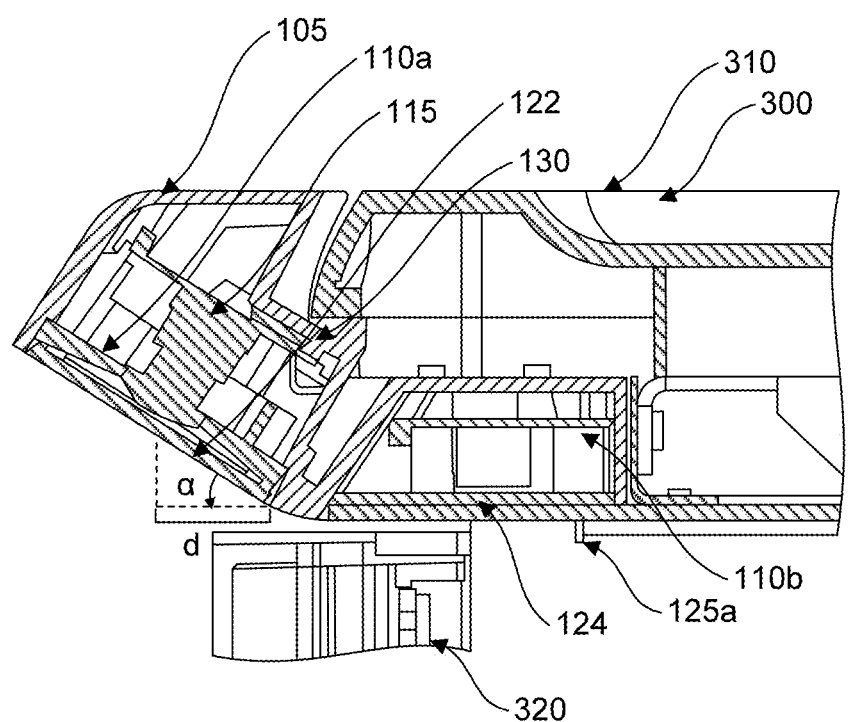
FIG. 6 depicts a side view of a cross section of an example of a mounted camera assembly, in accordance with some example embodiments.

In some example embodiments, the camera assembly 100 may be mounted on a medical device such as a diagnostic apparatus, an infusion pump, a dispensing cabinet, a wasting station, and/or the like. FIGS. 4-6 depict various views of an example of the camera assembly 100 mounted on a dispensing cabinet 300, in accordance with some example embodiments. In the example shown in FIGS. 4-6, the camera assembly 100 may be mounted on top of the dispensing cabinet 300. For example, a first portion of the camera assembly 100 may be inserted into a cavity within the top panel 310 of the dispensing cabinet. The first portion of the camera assembly 100 may be further configured to receive one or more fasteners 125 such that the first portion of the camera assembly 100, upon being slid into the cavity within the top panel 310, may be secured to the dispensing cabinet 300 with the one or more fasteners 125 (or a different retention mechanism such as snap-fit, friction-fit, magnets, adhesives, and/or the like). As shown in FIG. 1B, the first portion of the housing 105 may have a first height $h_1$ while the second portion of the housing 105 may have a second height $h_2$. The second height $h_2$ may be less than the first height $h_1$ such that the first portion of the camera assembly 100 extends above the second portion of the camera assembly. Once mounted, the first portion of the mounted camera assembly 100 shown in FIGS. 3-6, which remains outside of the panel 310, may extend upward against the front exterior surface of the panel 310. Contrastingly, the second portion of the camera assembly 100 may extend inward and be secured against one or more interior surfaces of the panel 310.

The cavity in the top panel 310 accommodating the second portion of the camera assembly 100 may be sealed around the mounted camera assembly 100, for example, by one or more fascia panels 330 covering the front of the top panel 310, which minimizes accessibility to the one or more fasteners 125 securing the camera assembly 100. As such, once mounted, removing the camera assembly 100 from the dispensing cabinet 300 may require at least a partial disassembly of the camera assembly 100 and/or the dispensing cabinet 300. These challenges may thwart efforts to remove the mounted camera assembly 100 and evade surveillance by the camera assembly 100.

In some implementations, the camera assembly 100 may include a tamper detector. The tamper detector may provide a signal or message when a threshold level of tampering is detected at the camera assembly 100. The tamper detection may include identifying removal of one or more fasteners. The tamper detection may include detecting motion such as via an accelerometer. The tamper detection may be optical such as using a light detector to on a side of the camera assembly 100 facing the dispensing cabinet 300. When installed, light the light detector will be obstructed at the interface between a first surface of the camera assembly 100 and corresponding surface of the dispensing cabinet 300. However, if the camera assembly 100 is moved or angled away from the dispensing cabinet 300, the tamper detector may generate a tamper detection signal. The tamper detector may include software. For example, upon installation, an ideal image of the desired field of view may be captured. Periodically, the tamper detector may capture an image of the current field of view and compare the image with the ideal image. The comparison may include identifying and comparing locations of objects in the images such as light fixtures, tile markings, walls, and the like. The comparison may include generating a color histogram for each image and determining whether there is a correspondence between the histograms. Upon detection of tampering, the camera 115 may be disabled until reset such as by an administrator using a device in communication with the camera assembly 100 or activation of an electromechanical switch or button using a specialized tool or sequence of activation.

The housing 105 of the camera assembly 100 may be configured to provide a flush mounting between the camera assembly 100 and the dispensing cabinet 300. For example, as shown in FIG. 5, once mounted, a first surface 320a of the camera assembly 100 may conform to a second surface 320b of the panel 310 such that the first surface 320a is flush against the second surface 320b. In the example shown in FIG. 5, the flush mounting may be achieved by the first surface 320a and the second surface 320b having a same shape or complementary shapes. Moreover, in the cross section of the mounted camera assembly 100 shown in FIG. 6, the heat sink 130 may be formed by an indentation in the housing 105 with the indentation receiving and/or engaging with a flange in the panel 310 to achieve the flush mounting. The flush mounting may improve the aesthetics of the mounted camera assembly 100 as well as thwart efforts to remove the camera assembly 100 once the camera assembly 100 is mounted to the dispensing cabinet 300.

In some example embodiments, the housing 105 of the camera assembly 100 may be configured to maintain the camera 115 at an orientation and position that maximizes the field of view of the camera 115 mounted on the dispensing cabinet 100. As shown in FIG. 6, the housing 105 may maintain the camera 115 at an angle α and an offset d from a front surface of the dispensing cabinet 300 (e.g., the door 320 and/or the like). Moreover, the camera assembly 100 may be mounted at a height h (see FIG. 4) while the lens of the camera 115 may have a focal length l. For example, the camera 115 may include one or more wide angle lens or ultra wide angle lens (e.g., fisheye lens and/or the like). The camera 115 may capture visible or non-visible light. In some implementations, a thermal imaging camera may be included. A thermal imaging camera may be used to capture thermal data about a user of the dispensing cabinet. For example, thermal characteristics may indicate potential opioid use or identify clinicians who are ill (e.g., fever) and should not be working with patients. The angle α may be selected based on the drawers included in the dispensing cabinet 300 to ensure that the camera 115 can capture interaction with contents of each drawer when fully extended from the dispensing cabinet.

The housing 105 of the camera assembly 100 may also be configured to orient the camera 115 towards the one or more areas of interest. For instance, in the example shown in FIGS. 3-6 where the camera assembly 100 is mounted on the top of the dispensing cabinet 300, the housing 105 of the camera assembly 100 may orient the camera 115 downwards at least because the interactions with the dispensing cabinet 300, including accessing the door 320 to retrieve and/or return a medication to the dispensing cabinet 300, are expected to transpire below the camera assembly 100. In other examples, the camera assembly 100 may be mounted on a side of the dispensing cabinet 300, in which case the housing 105 of the camera assembly 100 may orient the camera 105 sideways towards the one or more areas of interest. The camera assembly 100 may also be mounted on the bottom of the dispensing cabinet 300, in which case the housing 105 of the camera assembly 100 may orient the 105 upwards.

One or more of the orientation, the angle α, the offset d, the focal length l of the camera 115, and the height h may be adjusted in order to maximize the field of view of the camera 115. Alternatively and/or additionally, one or more of the orientation, the angle α, the offset d, the focal length l of the camera 115, and the height h may be adjusted such that the field of view of the camera 115 includes the one or more areas of interest. One or more of the orientation, the angle α, the offset d, the focal length l of the camera 115, and the height h may be adjusted in order to exclude one or more areas where surveillance is unsuitable, prohibited, and/or unnecessary. For instance, for the camera assembly 100 mounted on the dispensing cabinet 300, the field of view of the camera 115 may include one or more areas of interest where interactions with the dispensing cabinet 300 occur or are expected to occur. Such interactions may include a clinician accessing the dispensing cabinet 300, for example, by opening the door 320 to retrieve and/or to return a medication before closing the door 320.

In some example embodiments, the field of view of the camera 115 may be deterministic. For example, the housing 105 of the camera assembly 100 may maintain the camera 115 in a fixed position (e.g., at the angle α and the offset d) to ensure that the field of view of the camera 115 includes the one or more areas of interest once the camera 115 is mounted to the dispensing cabinet 300. In the fixed position, the field of view of the camera 115 may further exclude certain areas, for example, where surveillance is unsuitable, prohibited, or unnecessary. Maintaining the camera 115 in the fixed position may further prevent inadvertent changes to the field of view of the camera 115, for example, during transit, installation, and/or operation.

Figure 7:
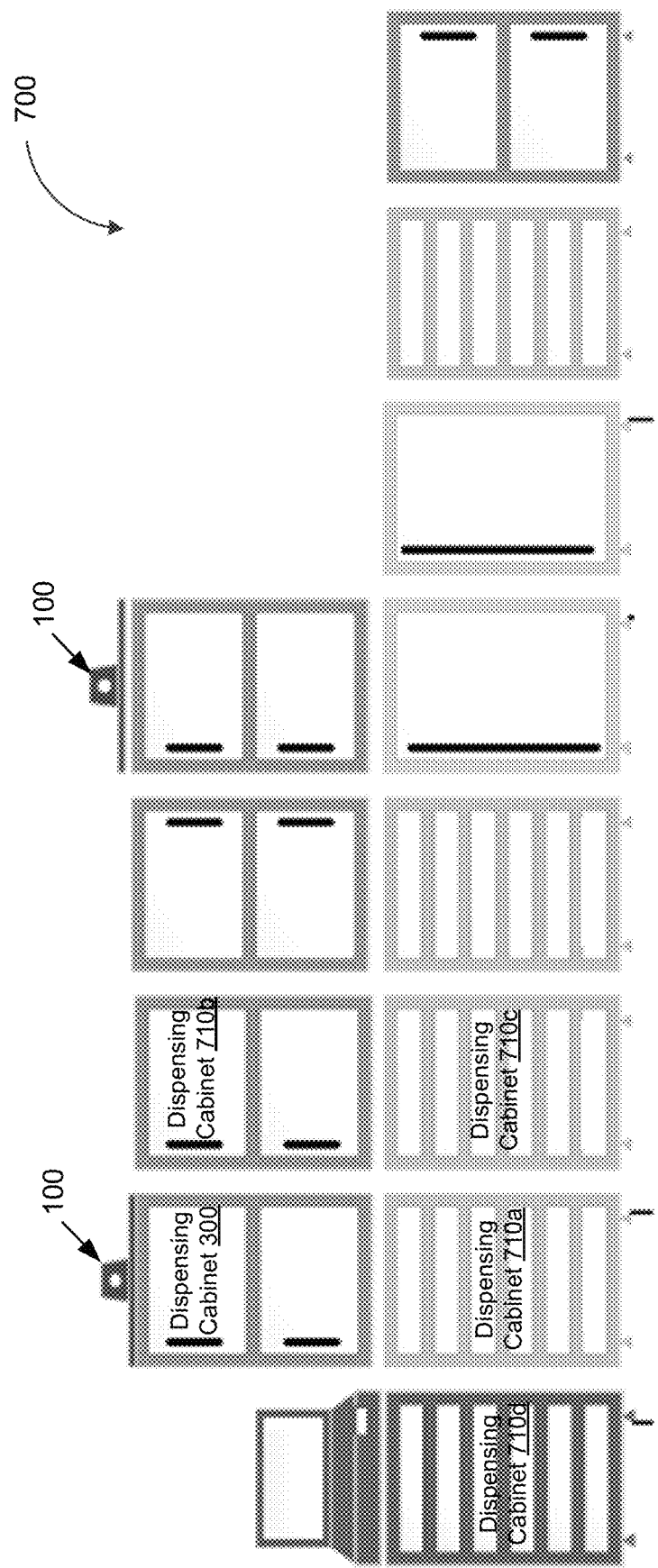
FIG. 7 depicts a schematic diagram illustrating an example of a medication management system, in accordance with some example embodiments.

FIG. 7 depicts a schematic diagram illustrating an example of a medication management system 700 with the camera assembly 100, in accordance with some example embodiments. In the example of the medication management system 700 shown in FIG. 7, one or more of the camera assemblies 100 may be mounted on top of a dispensing cabinet such as the dispensing cabinet 300. Moreover, as shown in FIG. 7, the medication management system 700 may support a modular configuration in which the dispensing cabinet 300 may be stacked on top of and/or next to other dispensing cabinets such as a first dispensing cabinet 710a, a second dispensing cabinet 710b, a third dispensing cabinet 710c, a fourth dispensing cabinet 710d, and/or the like. In the example of the medication management system 700 shown in FIG. 7, the mounting height h of the camera assembly 100 may correspond to a combined height of the dispensing cabinet 300 and the first dispensing cabinet 710a.

In some example embodiments, the field of view of the camera 115 may be maximized in order to capture activities at the medication management system 700. For example, the field of view of the camera 115 may include one or more areas of interest where interactions with the medication management system 700 occur or are expected to occur. Accordingly, the housing 105 of the camera assembly 100 may be configured to maintain the camera 115 in an orientation (e.g., downwards, upwards, sideways, and/or the like) and position (e.g., angle α, the offset d, and/or the like) from which the field of view of the camera 115 includes the one or more areas of interest. In the example of the medication management system 700 shown in FIG. 7, the field of view of the camera 115 may include one or more areas of interest where interactions with the dispensing cabinet 300 occur or are expected to occur. The camera 115 may therefore be able to capture one or more image of the activities at the medication management system 700.

The camera 115 may be motion activated such that the camera 115 may capture the one or more images in response to detecting motion within the one or more areas of interest where interactions with the dispensing cabinet 300 occur or are expected to occur. The one or more images may be still images and/or form a part of a video. The one or more images may be used in workflows associated with the detection, investigation, and prevention of various anomalous behavior associated with at least a portion of the medication dispensing system 700. For instance, the one or more images may be analyzed to determine whether the activities exhibit anomalies indicative of diversion, medical error, hazardous behavior, protocol noncompliance, and/or the like.

In some example embodiments, the field of view of the camera 115 may encompass one or more areas of interest where interactions with one or more adjacent medical devices such as dispensing cabinets occur or are expected to occur. As noted, the camera 115 may include one or more wide angle lenses and/or ultra wide angle lenses (e.g., fisheye lens and/or the like) such that the field of view of the camera 115 may extend beyond areas of interest associated with the dispensing cabinet 300 on which the camera assembly 100 is mounted. Thus, in the example of the medication management system 700 shown in FIG. 7, the field of view of the camera 115 may further include one or more areas of interest in which interactions with the first dispensing cabinet 710a, the second dispensing cabinet 710b, the third dispensing cabinet 710c, and/or the fourth dispensing cabinet 710d occur or are expected to occur.

The field of view of the camera 115 may be maximized, for example, to encompass adjacent medical devices by at least adjusting one or more of an orientation, angle α, offset d, focal length l, and mounting height h. Maximizing the field of view of the camera 115 to capture interactions with adjacent medical devices may improve the efficiency and cost effectiveness of the camera assembly 100. For example, instead of installing the camera assembly 100 at each dispensing cabinet included in the medication management system 700, a smaller quantity of the camera assembly 100 may be used to achieve the same (or comparable) coverage.

The camera assembly 100 may include a visual indicator such as a light (e.g., a light emitting diode (LED) and/or the like) to indicate status of the camera 115. Different colors may represent different statuses such as: camera is actively capturing or recording data; camera is operational but not capturing or recording; camera is disabled; camera tampering detected; camera is calibrating (e.g., capturing an image of an ideal field of view); or the like.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Item 1: An apparatus, comprising: a camera; one or more heat sinks configured to dissipate heat generated by the camera; and a housing configured to maintain the camera in a fixed position while the apparatus is mounted on a medical device, the housing having a first portion configured to be inserted into a cavity within a panel of the medical device, the first portion of the housing being further configured to receive one or more fasteners for securing the apparatus to the medical device, the camera in the fixed position having a deterministic field of view that includes a first area in which a first interaction with the medical device occurs or is expected to occur.

Item 2: The apparatus of Item 1, wherein the housing maintains the camera at an angle from which the deterministic view of the camera includes the first area.

Item 3: The apparatus of any one of Items 1 to 2, wherein the housing maintains the camera at an offset from which the deterministic field of view of the camera includes the first area.

Item 4: The apparatus of any one of Items 1 to 3, wherein the apparatus is mounted at a height and/or an orientation from which the deterministic field of view of the camera includes the first area.

Item 5: The apparatus of any one of Items 1 to 4, wherein the deterministic field of view of the camera further excludes a second area.

Item 6: The apparatus of any one of Items 1 to 5, wherein the camera includes one or more wide angle lenses and/or ultra wide angle lenses.

Item 7: The apparatus of any one of Items 1 to 6, wherein a second portion of the housing is configured to remain outside of the cavity and form a flush mounting between the apparatus and an exterior surface of the panel of the medical device.

Item 8: The apparatus of any one of Items 1 to 7, wherein the one or more heat sinks comprise an indentation in the housing of the apparatus, and wherein the indentation is configured to receive and/or engage with a flange in the panel of medical device.

Item 9: The apparatus of any one of Items 1 to 8, wherein the one or more heat sinks are in thermal contact with a printed circuit board including the camera.

Item 10: The apparatus of Item 9, wherein an interface material is interposed between a surface of the one or more heat sinks and the printed circuit board, and wherein the interface material is configured to maximize the thermal contact between the one or more heat sinks and the printed circuit board.

Item 11: The apparatus of any one of Items 1 to 10, wherein the medical device comprises a diagnostic apparatus, an infusion pump, a dispensing cabinet, a wasting station.

Item 12: The apparatus of any one of Items 1 to 11, wherein the deterministic field of view of the camera further includes a second area in which a second interaction with another medical device occurs or is expected to occur.

Item 13: The apparatus of any one of Items 1 to 12, wherein the camera is configured to capture one or more images of the first interaction with the medical device.

Item 14: The apparatus of Item 13, wherein the one or more images are analyzed to detect an anomalous behavior including one or more of a diversion, a medical error, a hazardous behavior, and a protocol noncompliance.

Item 15: The apparatus of any one of Items 1 to 14, further comprising: a tamper detector configured to detect tampering at the apparatus and generate a signal in response to detecting a threshold level of tampering at the apparatus.

Item 16: The apparatus of Item 15, wherein the tampering includes a removal of one or more fasteners securing the apparatus.

Item 17: The apparatus of any one of Items 15 to 16, wherein the tampering includes a change in the deterministic field of view of the camera.

Item 18: The apparatus of any one of Items 15 to 17, wherein the tamper detector includes an optical sensor.

Item 19: The apparatus of any one of Items 15 to 18, wherein the tamper detector comprises: at least one data processor; and at least one memory storing instructions, which when executed by the at least one data processor, result in operations comprising: analyzing an image of a current field of view of the camera by at least comparing the image to a reference image of a field of view of the camera; and detecting, based at least on the analysis indicating an above-threshold difference between the image and the reference image, the threshold level of tampering at the apparatus.

Item 20: The apparatus of Item 19, wherein the analysis includes identifying one or more objects present in each of the image and the reference image, and comparing a location of the one or more objects in each of the image and the reference image.

Item 21: The apparatus of any one of Items 19 to 20, wherein the analysis includes comparing a first color histogram of the image and a second color histogram of the reference image.

Item 22: The apparatus of any one of Items 15 to 21, wherein the camera is disabled in response to the signal indicating the threshold level of tampering at the apparatus.

Item 23: The apparatus of any one of Items 1 to 22, wherein the apparatus further comprises a visual indicator of a status of the apparatus.

Item 24: The apparatus of Item 23, wherein the visual indicator comprises a light emitting diode configured to display a first color corresponding to a first status and a second color corresponding to a second status.

Item 25: The apparatus of Item 24, wherein the first status and the second status comprises a different one of the camera actively capturing or recording data, the camera being operational but not capturing or recording data, the camera being disabled, tampering being detected at the apparatus, and calibration being performed at the apparatus.

Item 26: A dispensing cabinet, comprising: an enclosure for storing one or more medications and/or medical supplies; and a camera assembly including a camera, one or more heat sinks configured to dissipate heat generated by the camera, and a housing configured to maintain the camera in a fixed position while the camera assembly is mounted on the dispensing cabinet, at least a portion of the housing being configured to be inserted into a cavity within a panel of the dispensing cabinet, at least the portion of the housing being further configured to receive one or more fasteners for securing the camera assembly to the dispensing cabinet, the camera in the fixed position having a deterministic field of view that includes a first area in which an interaction with the dispensing cabinet occurs or is expected to occur, and the deterministic field of view further excluding a second area.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An apparatus, comprising:
   a camera;
   one or more heat sinks configured to dissipate heat generated by the camera; and
   a housing configured to maintain the camera in a fixed position while the apparatus is mounted on a medical device, the housing having a first portion configured to be inserted into a cavity within a panel of the medical device, the first portion of the housing being further configured to receive one or more fasteners for securing the apparatus to the medical device, the camera in the fixed position having a deterministic field of view that includes a first area in which a first interaction with the medical device occurs or is expected to occur; and
   a visual indicator comprising a light emitting diode configured to display one or more colors corresponding to one or more statuses of the camera, wherein the one or more statuses comprise a first status of the camera actively capturing or recording data, a second status of the camera being operational but not capturing or recording data, a third status of the camera being disabled, and a fourth status of camera tampering detected at the apparatus.

2. The apparatus of claim 1, wherein the housing maintains the camera at an angle from which the deterministic field of view of the camera comprises the first area.

3. The apparatus of claim 1, wherein the housing maintains the camera at an offset from which the deterministic field of view of the camera comprises the first area.

4. The apparatus of claim 1, wherein the apparatus is mounted at a height and/or an orientation from which the deterministic field of view of the camera comprises the first area.

5. The apparatus of claim 1, wherein the deterministic field of view of the camera further excludes a second area.

6. The apparatus of claim 1, wherein the camera comprises one or more wide angle lenses and/or ultra wide angle lenses.

7. The apparatus of claim 1, wherein a second portion of the housing is configured to remain outside of the cavity and form a flush mounting between the apparatus and an exterior surface of the panel of the medical device.

8. The apparatus of claim 1, wherein the one or more heat sinks comprise an indentation in the housing of the apparatus, and wherein the indentation is configured to receive and/or engage with a flange in the panel of medical device.

9. The apparatus of claim 1, wherein the one or more heat sinks are in thermal contact with a printed circuit board comprising the camera, and wherein an interface material is interposed between a surface of the one or more heat sinks and the printed circuit board to maximize the thermal contact between the one or more heat sinks and the printed circuit board.

10. The apparatus of claim 1, wherein the medical device comprises a diagnostic apparatus, an infusion pump, a dispensing cabinet, and/or a wasting station.

11. The apparatus of claim 1, wherein the deterministic field of view of the camera further comprises a second area in which a second interaction with another medical device occurs or is expected to occur.

12. The apparatus of claim 1, wherein the camera is configured to capture one or more images of the first interaction with the medical device, and wherein the one or more images are analyzed to detect an anomalous behavior comprising one or more of a diversion, a medical error, a hazardous behavior, and a protocol noncompliance.

13. The apparatus of claim 1, further comprising:
a tamper detector configured to detect tampering at the apparatus and generate a signal in response to detecting a threshold level of tampering at the apparatus, the tampering comprises at least one of a removal of one or more fasteners securing the apparatus and a change in the deterministic field of view of the camera.

14. The apparatus of claim 13, wherein the tamper detector comprises an optical sensor.

15. The apparatus of claim 13, wherein the tamper detector comprises:
at least one data processor; and
at least one memory storing instructions, which when executed by the at least one data processor, result in operations comprising:
performing an analysis of an image of a current field of view of the camera by at least comparing the image to a reference image of a field of view of the camera; and
detecting, based at least on the analysis indicating an above-threshold difference between the image and the reference image, the threshold level of tampering at the apparatus.

16. The apparatus of claim 15, wherein the analysis comprises identifying one or more objects present in each of the image and the reference image, and comparing a location of the one or more objects in each of the image and the reference image.

17. The apparatus of claim 15, wherein the analysis comprises comparing a first color histogram of the image and a second color histogram of the reference image.

18. The apparatus of claim 13, wherein the camera is disabled in response to the signal indicating the threshold level of tampering at the apparatus.

19. The apparatus of claim 1, wherein the one or more statuses further comprise a fifth status of camera calibration being performed at the apparatus.

20. A dispensing cabinet, comprising:
an enclosure for storing one or more medications and/or medical supplies;
a camera assembly comprising a camera, one or more heat sinks configured to dissipate heat generated by the camera, and a housing configured to maintain the camera in a fixed position while the camera assembly is mounted on the dispensing cabinet, at least a portion of the housing being configured to be inserted into a cavity within a panel of the dispensing cabinet, at least the portion of the housing being further configured to receive one or more fasteners for securing the camera assembly to the dispensing cabinet, the camera in the fixed position having a deterministic field of view that comprises a first area in which an interaction with the dispensing cabinet occurs or is expected to occur, and the deterministic field of view further excluding a second area; and
a visual indicator comprising a light emitting diode configured to display one or more colors corresponding to one or more statuses of the camera, wherein the one or more statuses comprise a first status of the camera actively capturing or recording data, a second status of the camera being operational but not capturing or recording data, a third status of the camera being disabled, and a fourth status of camera tampering detected at the dispensing cabinet.

* * * * *